United States Patent [19]

Stewart et al.

[11] 4,114,074
[45] Sep. 12, 1978

[54] DEVICE FOR ELECTRONIC DIRECTION CONTROL OF TROLLING MOTORS

[75] Inventors: Alan Stewart, Fayetteville; Richard Lee Majefski, Combs, both of Ark.

[73] Assignee: Shakespeare of Arkansas, Inc., Fayetteville, Ark.

[21] Appl. No.: 744,337

[22] Filed: Nov. 23, 1976

[51] Int. Cl.$^2$ ............................................. H02P 7/28
[52] U.S. Cl. .................................... 318/257; 318/265
[58] Field of Search ........................ 318/257, 265, 664

[56] References Cited

U.S. PATENT DOCUMENTS

| 2,417,015 | 3/1947 | Razek | 318/664 |
|---|---|---|---|
| 2,583,059 | 1/1952 | Neville | 318/265 X |
| 2,786,169 | 3/1957 | Muffly | 318/664 |
| 3,246,222 | 4/1966 | Ogawa et al. | 318/257 X |
| 3,731,171 | 5/1973 | Holley, Jr. | 318/664 X |

Primary Examiner—Robert K. Schaefer
Assistant Examiner—W. E. Duncanson, Jr.
Attorney, Agent, or Firm—Hamilton, Renner & Kenner

[57] ABSTRACT

Disclosed is a device for electronic direction control of trolling motors for maneuvering boats. The device includes a power supply, a steering mechanism including a motor for altering the direction of the trolling motor thrust, a direction control for generating a signal proportional to the desired direction of trolling motor thrust, and a direction sensor for generating a signal proportional to the actual direction of trolling motor thrust. Two electronic circuits are provided to process the desired and actual direction signals. The first circuit provides a pulse width modulated output signal which variably controls the angular velocity of the steering mechanism by controlling the operational state of a switching circuit having at least one transistor and thereby controlling the flow of current to the steering motor. The second circuit provides an output signal which controls the direction of steering mechanism rotation by controlling the operational state of a direction relay and thereby controlling the direction of current flow to the steering motor.

12 Claims, 3 Drawing Figures

DEVICE FOR ELECTRONIC DIRECTION CONTROL OF TROLLING MOTORS

BACKGROUND OF THE INVENTION

This invention relates generally to a direction control system for a boat. More specifically, the invention relates to an electronic direction control for trolling motors such as commonly associated with boats.

In the past, direction control systems for boats have suffered from a variety of defects which have resulted in an inability to quickly, accurately and precisely control the exact steering mechanism position desired. One recent electronic direction control system for boats generates a differential signal, the magnitude and polarity of which is dependent on the angular position of the steering wheel with respect to a vertical plane encompassing the longitudinal axis of the boat. According to its magnitude and polarity, this signal, which has a unique, maintained constant magnitude and polarity for each position of the steering wheel, biases one of two transistors in a switching circuit into such an operational state as to permit actuation of the appropriate one of two direction control motors.

Thus, regardless of the extent to which the desired and actual directions of the steering mechanism differ instantaneously, the angular velocity of the steering mechanism remains constant throughout all periods of direction correction which results in long transient response times. Also, since the angular velocity of the steering mechanism abruptly changes from a relatively large value to zero when the desired direction is reached, fractional direction changes become abrupt and difficult, if not impossible, to achieve and commonly occur with large mechanical overshoot in the position of trolling motor.

Furthermore, the trolling motor is limited to a relatively small range of directions thereby severely limiting maneuverability of the boat, since each direction control motor rotates the trolling motor propeller about a support shaft perpendicular to its drive shaft in opposite directions by forcing a piston into engagement with the trolling motor propeller gear assembly housing. Although other non-electronic direction control systems for boats have disclosed maneuverability ranges of up to ± 180° relative to the instantaneous actual direction of travel, no known direction control systems have heretofore effectuated maneuverability ranges of greater than ± 180°. Such a maneuverability range is highly desirous when navigating around obstacles in areas which highly restrict freedom of movement.

SUMMARY OF THE INVENTION

It is therefore an object of the invention to provide a device for quick, accurate and precise directional control of trolling motors employed in boats.

It is another object of the invention to provide a device for the directional control of trolling motors employed in boats, as above, in which the angular velocity of the steering mechanism is varied in direct proportion to the magnitude of the difference between the desired direction of trolling motor thrust and the actual direction of trolling motor thrust, thereby permitting precise fractional direction changes.

It is still another object of the invention to provide a device for the directional control of trolling motors employed in boats, as above, in which a first signal representing the desired direction of trolling motor thrust and a second signal representing the actual direction of trolling motor thrust are generated and electronically processed to vary the angular velocity of the steering mechanism in the manner stated above, and to vary the direction of the trolling motor thrust as desired.

It is yet another object of the invention to provide a device for the directional control of trolling motors employed in boats, as above, wherein a signal representing the magnitude of the difference between further signals representing the desired direction of trolling motor thrust and the actual direction of trolling motor thrust is modulated, which in the preferred embodiment is illustrated as being pulse width modulated.

It is still a further object of the invention to provide a device for the directional control of trolling motors employed in boats, as above, in which the modulated signal modulates the bias of at least one steering motor current control output transistor so as to vary the time period during which current is allowed to pass through the output transistor circuit to the input of the trolling motor steering motor and thereby proportionally vary the angular velocity of the steering mechanism.

It is another object of the invention to provide a device for the directional control of trolling motors employed in boats, as above, which by variation of the angular velocity of the steering mechanism in direct proportion to the magnitude of the difference between the desired direction of trolling motor thrust and the actual direction of trolling motor thrust, minimizes or eliminates abrupt directional changes and mechanical overshoot in the position of the trolling motor steering mechanism.

It is yet a further object of the invention to provide a device for directional control of trolling motors employed in boats, as above, allowing an improved range of maneuverability.

These and other objects and advantages of the present invention over existing prior art forms will become more apparent and fully understood from the following description in conjunction with the accompanying drawings.

In general, a device embodying the concept of the present invention includes a power supply, a steering mechanism for altering the direction of the trolling motor thrust including a motor, a direction control for generating a signal proportional to the desired direction of trolling motor thrust, and a direction sensor for generating a signal proportional to the actual direction of trolling motor thrust. An electronic circuit is provided to process the desired and actual direction signals and provides an output signal which variably controls the angular velocity of the steering mechanism.

DESCRIPTION OF THE PREFERRED EMBODIMENT

Figure 1:
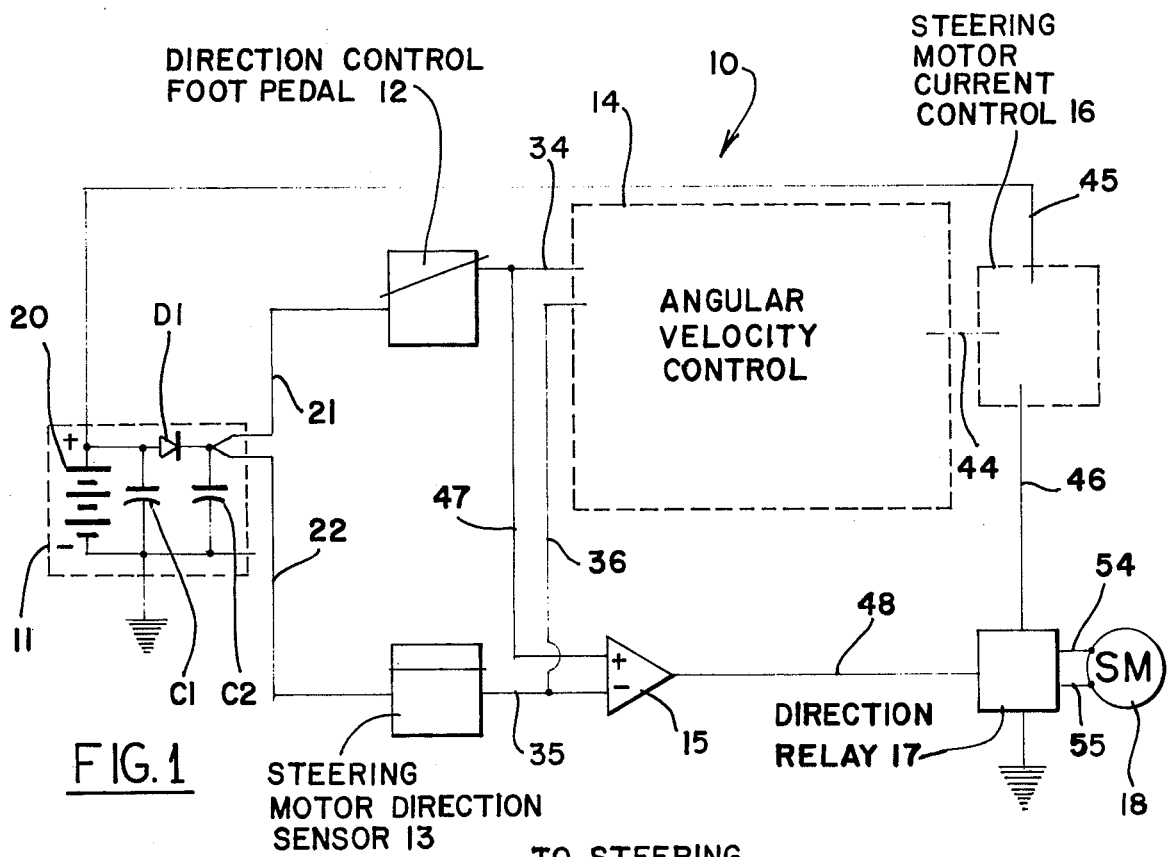
FIG. 1 is a somewhat schematic block diagram of a device embodying the principles of the present invention.

An electronic direction control device for trolling motors is depicted in FIG. 1 and is generally indicated by the numeral 10. As an overall description, the device 10 includes a power supply 11 which is connected to both a direction control foot pedal 12 and a steering motor direction sensor 13. Direction control foot pedal 12 and steering motor direction sensor 13 are both connected to an angular velocity control 14 and a direction control amplifier 15. A steering motor current control 16 and a direction relay 17 are connected to angular velocity control 14 and direction control amplifier 15, respectively. A direct current steering motor 18 having a permanent magnetic field is provided for control of the direction of the trolling motor thrust and is connected to direction relay 17. The details of a preferred embodiment for these connections and the operation of the aforementioned devices will now be described.

As shown in FIG. 1, power supply 11 includes a direct current (D.C.) power supply such as a battery 20 and a $\pi$ configuration protection network comprised of a capacitor C1 connected across the terminals of like polarity of battery 20 and a capacitor C2 connected in parallel with capacitor C1 but with the anode of diode D1 connected to the positive terminal of capacitor C1 and its cathode connected to the positive terminal of capacitor C2. Capacitors C1 and C2 prevent a drain of power from battery 20 during the initial energization of the steering motor 18. Diode D1 blocks the discharge of capacitor C2 by the motor load while also protecting device 10 against the accidental application of incorrect polarity. The negative terminal of battery 20 may be grounded to minimize induced electronic noise signals in the circuitry and to minimize conductor costs in construction.

Although a separate power supply (not shown) may be utilized to power steering motor 18, the preferred embodiment achieves greater economy by using a single battery to power both steering motor 18 and the entire control circuitry of device 10. Since the most prevalent steering motor voltage is 12 volts, such a system voltage will be incorporated herein for convenience. However, the present invention could just as easily be operated with any other D.C. system voltage, such as 6 volts, either by the use of a voltage divider network for obtaining the requisite control voltages or by selecting control circuitry whose voltage operating ranges are compatible with those of the steering motor voltage.

Notwithstanding the magnitude of the system voltage, in order to maximize both noise immunity and steering response it is generally desirable to provide a reference control voltage intermediate of the power supply 11 and the zero or ground level, while still being compatible with the circuitry involved. Merely for purposes of illustration we have selected such an "intermediate control voltage" (hereinafter ICV) of one-half the nominal battery supply voltage — 6 volts herein, which voltage may be provided by the conventional voltage divider network (not shown) previously suggested.

Direction control foot pedal 12 is connected to the positive terminal of capacitor C2 by conductor 21 and may be any conventional direction control unit with an adjustable voltage divider network of the resistance type such as a potentiometer (not shown) which permits its output voltage to vary over the range required by angular velocity control 14 and direction control amplifier 15 to effectuate whatever range of maneuverability is desired, as will be detailed hereinafter.

The adjustable centertap of the potentiometer within direction control foot pedal 12 may be mechanically interlocked with the spatial position of the foot pedal so that a signal is generated whose D.C. voltage magnitude is directly proportional to the desired direction of trolling motor thrust as indicated by the spatial position of the foot pedal. Although direction control foot pedal 12 is to be taken as being representative of any suitable direction control unit including steering wheels, steering yokes, or joysticks, a foot pedal direction control unit is preferred because of its ability to allow the operator substantial freedom to simultaneously perform other tasks such as casting, retrieving or trolling of a fishing line.

Steering motor direction sensor 13, which is connected to the positive terminal of capacitor C2 by conductor 22, may be any conventional adjustable potentiometer similar to that of direction control foot pedal 12 with an adjustable centertap that may be mechanically interlocked with the position of the steering motor so as to generate a signal whose D.C. voltage magnitude is directly proportional to actual direction of the trolling motor thrust. Of course, such a mechanical interlock may be made to any steering mechanism component convenience dictates, providing the requisite signal is generated.

Figure 3:
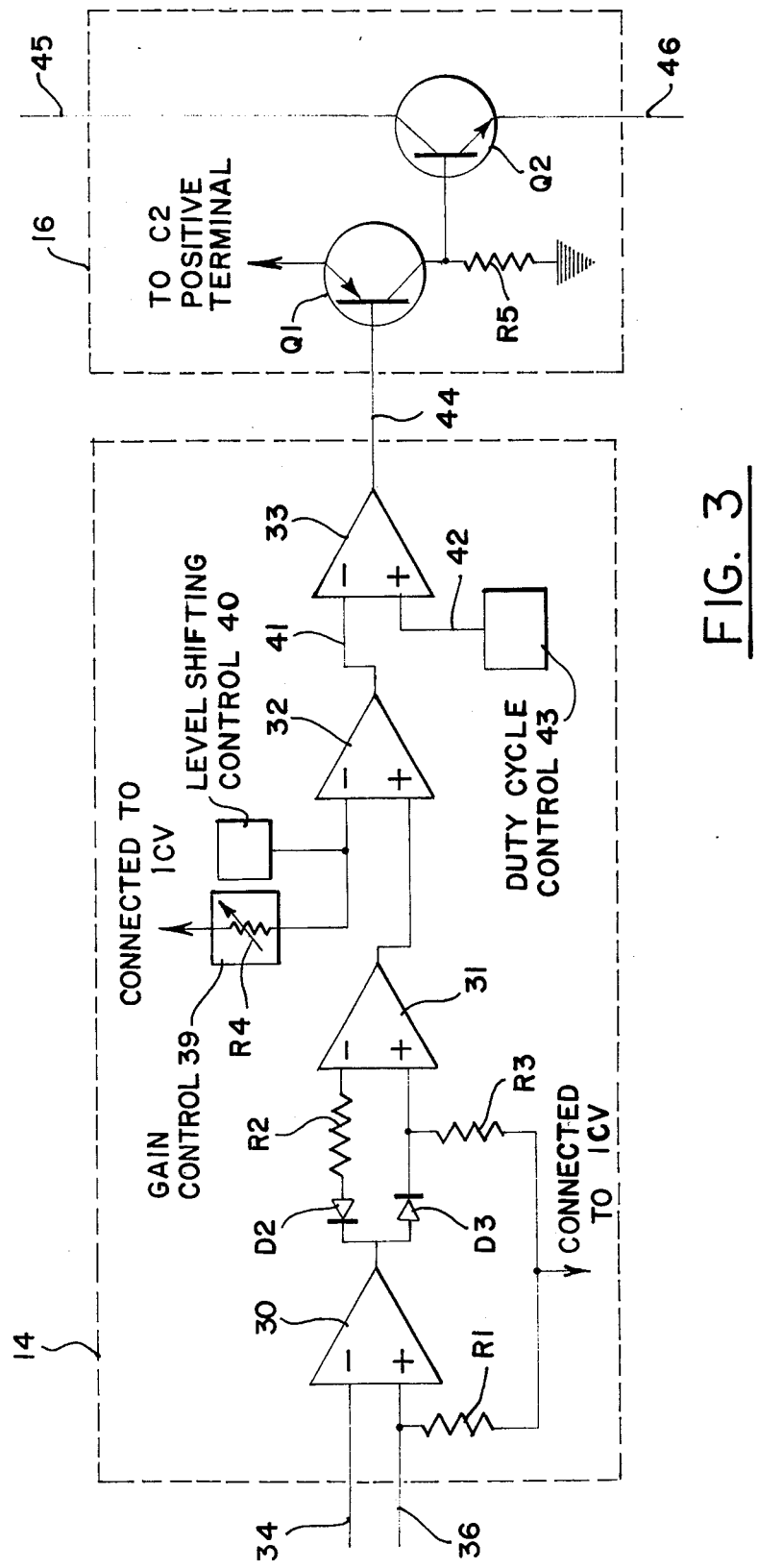
FIG. 3 is a schematic diagram of an exemplary angular velocity control and steering motor current control depicted in block form in FIG. 1.

As shown in FIG. 3, angular velocity control 14 includes differential amplifier 30, absolute-value (hereinafter A-V) amplifier 31, voltage-level shifter 32, and pulse width modulator 33, all of which may be conventional individual operational amplifiers connected in configurations to be described below, or which may be contained within a single commercial item such as manufactured by Motorola, Inc., Chicago, Illinois, Model No. MC3403P.

Differential amplifier 30 may be a conventional operational amplifier connected and operated in any of the well-known differential amplifier configurations with unity gain and resistive feedback between the differential amplifier output terminal and its inverting input terminal (typically indicated in FIG. 3 by a minus sign — feedback not shown). The adjustable centertap of direction control foot pedal 12 is connected to the inverting input terminal of differential amplifier 30 by conductor 34. The adjustable centerlap of steering motor direction sensor 13 is connected to the non-inverting input terminal of differential amplifier 30 (typically indicated in FIG. 3 by a plus sign) through conductors 35 and 36. The non-inverting terminal is also connected to the ICV through input resistor R1, insuring that when the magnitude of the two input signals into angular velocity control 14 are equal, i.e., when the desired and actual directions of the trolling motor thrust are equal, the output of differential amplifier 30 will be at the ICV which serves as the quiescent voltage. As the difference in magnitude of these two input signals increase, the output of differential amplifier 30 varies linearly about the quiescent voltage. The change in polarity (plus or minus) about the quiescent voltage is dependent on the polarity of the desired direction change.

Pulse width modulator 33 provides output pulses whose duration are directly proportional to the D.C. voltage magnitude of the input signal thereto with respect to the zero reference level. It is therefore necessary to insure that the signal received by pulse width modulator 33 has the same voltage magnitude for a given difference in the desired and actual directions of the trolling motor thrust regardless of the direction of the change. In order to accomplish this, A-V amplifier 31 takes the absolute value of the output of differential amplifier 30 with respect to the quiescent voltage (ICV herein). Voltage level-shifter 32 serves to shift the output signal from A-V amplifier 31 from a reference about the quiescent voltage to a reference about the zero or ground reference level.

A-V amplifier 31 may be a conventional operational amplifier connected and operated with unity gain and resistive feedback (not shown) between the A-V amplifier output terminal and its inverting input terminal. The cathode of a diode D2 and the anode of a diode D3 are connected to the output of differential amplifier 30. Although the cathode of diode D3 is connected directly to the non-inverting input terminal of A-V amplifier 31, the anode of diode D2 is connected to the inverting input terminal through input resistor R2. The ICV is also connected to the non-inverting input terminal of A-V amplifier 31 through input resistor R3.

The specific operation of A-V amplifier 31 is dependent upon the magnitude of the output signal from differential amplifier 30. When the output signal from differential amplifier 30 has a magnitude greater than the quiescent voltage, diodes D3 and D4 are biased into conducting and non-conducting states, respectively, thereby permitting such signal entrance into the non-inverting terminal of A-V amplifier 31. However, when the output signal from differential amplifier 30 has a magnitude less than the quiescent voltage, diode D4 is reverse biased into a conducting state while diode D3 is biased into a non-conducting state, thereby permitting such signal entrance into the inverting terminal of A-V amplifier 31. The connection of the non-inverting terminal of A-V amplifier 31 to the ICV through input resistor R3 insures that the absolute-value is taken about the ICV.

Voltage level-shifter 32 is connected and operated with variable gain and resistive feedback between its output terminal and its inverting input terminal (feedback not shown). A variable gain control 39 is connected to the inverting input terminal of voltage level shifter 32 and may include a variable resistor R4 connected between voltage level shifter 32 and the ICV. The gain should be variable over such a range so as to insure that the output signal from voltage level shifter 32 is of sufficient magnitude to cause the maximum possible output signal magnitude from pulse width modulator 33.

A variable level shifting control 40 is also connected to the inverting input terminal of voltage level shifter 32 and may consist of a separate conventional adjustable voltage divider network (not shown). This voltage divider network should be designed to provide a D.C. voltage signal of a magnitude at least equal to the ICV, thereby insuring that both input signals to voltage level-shifter 32 are referenced about the same voltage (ICV herein) and that the output therefrom will be referenced about the zero or ground level.

However, in some applications it may be desirable to reduce the system response sensitivity to spurious minor variations in any of the system signals and in particular to spurious minor variations in the output signal from direction control foot pedal 12 (as would occur when the operator rests his foot thereon). In such instances the variable level shifting control 40 may be designed to provide a D.C. voltage signal of a magnitude greater than the ICV to an extent proportional to the range of insensitivity (the so-called "dead-band") desired. Such a setting would have the additional advantages of further reducing both the mechanical overshoot of steering motor 18 and the so-called angular position "hunting" exhibited by control systems having feedback.

Pulse width modulator 33 may be connected and operated in any of the well-known voltage controlled pulse width modulator configurations with a gain sufficiently large to produce an output signal with sufficient current and voltage magnitude to operate steering motor current control 16 as explained hereinafter and with resistive feedback (not shown) between its output terminal and its non-inverting input terminal. The inverting input terminal of pulse width modulator 33 is connected to the output of voltage level shifter 32 by conductor 41. By utilizing any of the multitude of known techniques to control the voltage impressed upon the non-inverting terminal of pulse width modulator 33 via conductor 42, duty cycle control 43 permits adjustment of the minimum duration of the individual pulses during any continuous operational period of steering motor 18. This insures that a current which corresponds in magnitude to any particular angular velocity of steering motor 18 is permitted to flow for at least a sufficient time duration to allow proper energization and operation of steering motor 18 without the overheating, loss of efficiency and greatly reduced mean time to failure resulting from cycling the steering motor 18 on and off at a rate greater than that for which it is designed.

Steering motor current control 16 is shown in FIG. 3 as including at least one output transistor Q1, which is of the PNP type, for controlling the operational magnitude of current flowing to steering motor 18. In order that the control currents be properly oriented, a second complementary NPN type transistor Q2, capable of switching the greater of the transient maximum inrush current or the locked rotor current of steering motor 18, must be interposed between direction relay 17 and the collector of transistor Q1. As shown in FIG. 3, the base of transistor Q1 is connected to conductor 44, its collector connected to the base of transistor Q2 and also connected to ground through a self-biasing resistor R5, and its emitter connected to the positive terminal of capacitor C2. The collector of transistor Q2 is connected to the positive terminal of battery 20 by conductor 45, while the emitter of transistor Q2 is connected to direction relay 17 by conductor 46, as shall be hereinafter further detailed.

Angular velocity control 14 would typically operate as follows: differential amplifier 30 receives the output signals from direction control foot pedal 12 and steering motor direction sensor 13. As previously noted, since these signals are directly proportional to the desired and actual direction of trolling motor thrust, respectively, differential amplifier 30 outputs a further signal whose D.C. voltage magnitude from the quiescent value previously disclosed as ICV is directly proportional to the magnitude of the difference between these input signals. Moreover, depending upon the polarity of the desired direction change, this output signal may linearly vary both above and below the quiescent voltage. Thus, the greater the difference between the desired and actual direction of trolling motor thrust, the greater the D.C. voltage magnitude of the differential amplifier 30 output signal from the quiescent value. Of course, as the difference between the two directions decrease, the D.C. voltage magnitude of the differential amplifier 30 output signal continuously approaches the quiescent value until, upon alignment of the two directions, the output signal has a D.C. voltage magnitude of the ICV, a condition which may be referred to as the stabilized condition. However, it should be made clear that such a stabilized condition occurs whenever the desired and actual direction of trolling motor thrust coincide and not merely when the actual direction of trolling motor thrust is parallel to the longitudinal axis of the boat.

Next, the absolute value about ICV is taken of the output signal from differential amplifier 30 by A-V amplifier 31 and its voltage level shifted by voltage level shifter 32, both as previously described, whereupon this signal is received by pulse width modulator 33. Since the duration of the output pulse from pulse width modulator 33 is directly proportional to the D.C. voltage magnitude of the input signal thereto, the output signal from pulse width modulator 33 is a series of pulses, each pulse having a duration directly proportional to the difference between the desired and actual direction of trolling motor thrust occuring at approximately that instant of time, and having a magnitude preset by variable gain control 39, as previously described. When a stabilized condition has been achieved, there are no output pulses from pulse width modulator 33 since the input thereto has a voltage magnitude of zero.

Whenever a pulse is present, the gain of pulse width modulator 33 is sufficiently large to produce an output signal whose current and voltage magnitude is sufficient to bias transistor Q2 (through transistor Q1) into a saturated state in which a current is permitted to flow between the collector and emitter thereof, the magnitude of which is substantially constant and large enough to operate steering motor 18. Thus, when transistor Q1 is saturated the steering motor 18 current may flow throughout a closed loop including the positive terminal of battery 20; conductor 45; the collector and emitter terminals of transistor Q2; conductor 46; direction control relay 17 and steering motor 18, in a manner to be hereinafter further explained; and the ground "path" to the negative terminal of battery 20.

When the magnitude of the difference between the desired and actual direction of trolling motor thrust is large, each pulse received from the angular velocity control 14 will have a long duration thereby causing transistor Q1 to allow steering motor current to flow for equally long time periods. Conversely, when the magnitude of the difference between the desired and actual direction of trolling motor thrust is small, each pulse received from the angular velocity control 14 will have a relatively short duration thereby causing transistor Q1 to allow steering motor current to flow only for an equally short time period. It should now be evident that steering motor current control 16 responds as a current switch whose duration in either the "on" or "off" operational states is directly proportional to the magnitude of the difference between the desired and actual direction of trolling motor thrust, allowing for a proportional variation in the angular velocity of the steering mechanism.

Direction control amplifier 15, as seen in FIG. 1, may be a conventional comparator amplifier such as any one of the plurality of comparator amplifiers contained within the commercial item manufactured by Motorola, Inc., Chicago, Illinois, Model No. MC3302, and also utilized for pulse width modulator 33. Direction control amplifier 15 also may be a conventional operational amplifier connected and operated in any of the well-known comparator configurations with a gain sufficiently large to produce an output signal with sufficient current and voltage magnitude to operate direction relay 17, as explained hereinafter, and with resistive feedback (not shown) between direction control amplifier 15 output terminal and its non-inverting input terminal. The adjustable centertap of direction control foot pedal 12 is connected to the non-inverting input terminal of direction control amplifier 15 through conductors 34 and 47 while the adjustable centertap of steering motor direction sensor 13 is connected to the inverting input terminal of direction control amplifier 15 by conductor 35.

Figure 2:
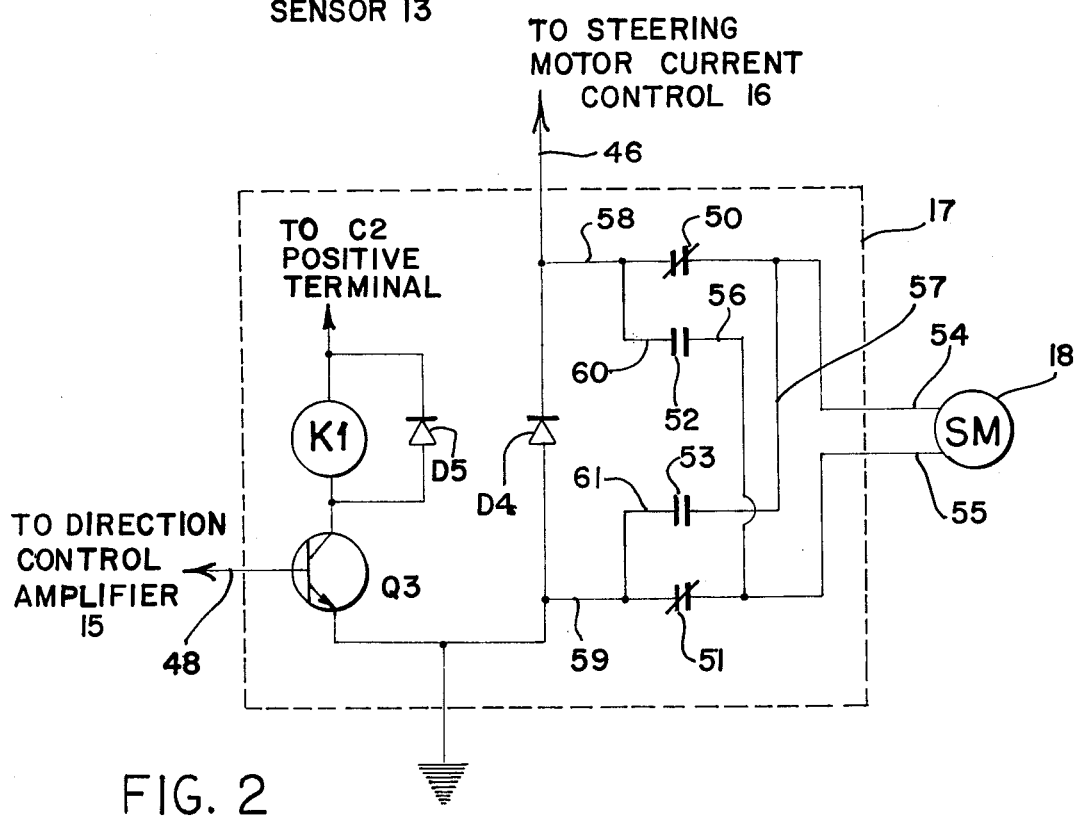
FIG. 2 is a schematic diagram of an exemplary direction relay depicted in block diagram form in FIG. 1.

The output of direction control amplifier 15 is connected through conductor 43 to direction relay 17, the details of which are shown in FIG. 2. Direction relay 17 can be considered a somewhat modified conventional electromagnetic relay with an electromagnetic relay coil K1 and two sets of contacts, including contacts 50, 51, which are normally closed when the relay coil K1 is de-energized, and contacts 52, 53 which are normally open when the relay coil K1 is de-energized. Both sets of contacts 50, 51 and 52, 53 are mechanically interlocked to open and close respectively when relay coil K1 is energized. Additionally, the mechanical interlock preferably may be designed to insure whichever contact sets are presently closed upon a change of state of relay coil K1 are opened prior to the closing of the other set of contacts so as to insure that steering motor 18 is de-energized prior to any reversal of the direction of current flow therethrough.

One terminal of each contact 50, 51 is connected to an armature winding terminal of steering motor 18 through conductors 54, 55 respectively. One terminal of each contact 52, 53 is connected through conductors 56, 57 and 55, 54 respectively to the armature winding terminal of steering motor 18 opposite that to which contacts 50, 51 are respectively connected. Although contacts 50, 51 may be connected to either of the armature winding terminals of steering motor 18, strictly for purposes of illustration and clarity in subsequent operational descriptions, this embodiment shall assume that contacts 50, 51 are connected so that when current flows through contacts 50, 51 to the armature winding of steering motor 18 the steering motor shall rotate in the clockwise direction. By appropriate construction of mechanical motion transmission devices, such as gear drive or linkage assemblies, clockwise rotation of the steering motor could result in either clockwise or counterclockwise rotation of the trolling motor drive screw support shaft. Of course, the desired direction of rotation is governed at least in part by the mounting location of the trolling motor. As the trolling motor is most frequently mounted on the bow of the boat, it shall again be assumed, for purposes of this description, that clockwise rotation of the steering motor results in counterclockwise rotation of the trolling motor drive screw support shaft thereby redirecting the trolling motor thrust so as to turn the boat towards its starboard side.

The terminals of contacts 50, 51 opposite conductors 54, 55 are connected through conductors 58, 59 to the cathode and anode of a diode D4, respectively. Similarly, the terminals of contacts 52, 53 opposite conductors 56, 57 are also connected through conductors 60 and 58, 61 and 59 to the cathode and anode of diode D4, respectively. The cathode of diode D4 is also connected to the emitter of transistor Q2 of motor current control 16 through conductor 46 while the anode is also connected to the negative terminal of battery 20, preferably through ground as previously explained.

In the remaining circuitry within direction relay 17, an NPN transistor Q3 has its emitter connected to the negative terminal of battery 20, again preferably through ground, its base connected to the output of direction control amplifier 15 through conductor 48, and its collector connected to both one end of relay K1 and the anode of diode D5. The cathode of diode D5 is connected both to the end of relay coil K1 opposite that to which the collector of transistor Q3 is connected and to the positive terminal of capacitor C2.

Typical operation of the direction sensing features of the preferred embodiment may now be detailed. Direction control amplifier 15 compares the relative voltage magnitude of the output signals from the direction control foot pedal 12 and motor direction sensor 13 and provides an output signal which, whenever the former input signal has a voltage magnitude greater than that of the latter input signal, immediately drives transistor Q3 into a saturated "on" state by controlling its base drive biasing voltage through conductor 48. With transistor Q3 in this "on" state the side of relay coil K1 connected to the collector of transistor Q3 is effectively connected to ground thereby permitting energization of relay coil K1. Diode D5, as a result of its low forward direction resistance, provides a low resistance bypass discharge path for the energy within relay coil K1 immediately after its de-energization, thereby preventing damage to transistor Q3 by energy discharge therethrough.

Prior to energization of relay coil K1, relay contacts 50, 51 are closed while relay contacts 52, 53 are open, as noted hereinbefore. When transistor Q1 is biased into the "on" state and the desired and actual direction of the trolling motor thrust are such that relay coil K1 remains de-energized, the steering motor current may flow through direction control 17 as follows: through conductors 46, 58, relay contact 50, and conductor 54 to one end of the steering motor 18 armature winding; through the armature winding, conductor 55, relay contact 51, and conductor 59 to the ground path connected thereto. Upon energization of relay coil K1, relay contacts 50, 51 open and relay contacts 52, 53 close which results in a reversal of the current direction through steering motor 18 armature winding since relay contacts 52, 53 are connected to opposite ends of the armature winding than that to which relay contacts 50, 51 are respectively connected. Diode D4, as a result of its low forward direction resistance, provides a low resistance bypass path for discharge of the energy within the armature winding of steering motor 18 immediately after de-energization, thereby preventing damage to transistors Q1 and/or Q2 by discharge therethrough.

Based on the conventions arbitrarily adopted above, where the boat operator desires to alter the direction of travel to the port side of the boat, he initiates such change by reorientating the spatial position of direction control foot pedal 12 proportional to the extent of the desired directional change. Next, direction control foot pedal 12 outputs a signal whose D.C. voltage magnitude has a greater positive value than that of the signal from steering motor direction sensor 13 causing a proportional differential voltage to be applied to the input of direction control amplifier 15 and to the input of velocity speed control 14. Since the signal from direction control foot pedal 12 has a more positive voltage magnitude than that of steering motor direction sensor 13, direction control amplifier 15 outputs a signal which biases transistor Q3 into an "on" state, thereby energizing relay coil K1, opening relay contacts 50, 51 and closing relay contacts 52, 53. The direction of current flow through steering motor 18 is consequentially reversed causing the steering motor 18 to turn in a counterclockwise direction so as to redirect the trolling motor thrust and turn the boat towards its port side.

Simultaneous to the operation of direction control amplifier 15, angular velocity control 14 receives the same aforementioned differential input and generates a pulse width modulated signal so as to bias transistor Q1 of the steering motor current control into an "on" state for a duration proportional to the magnitude of the differential input and which accordingly allows current to flow into steering motor 18 armature winding, all of which has been previously described in detail.

As the trolling motor rotates towards the desired direction, the signal voltage from the steering motor direction sensor 13 approaches the signal voltage from the direction control foot pedal 12 causing the steering motor angular velocity to decrease to zero as the differential voltage approaches zero whereupon transistor Q1 reverts into the cutoff state and discontinues current flow to steering motor 18 armature winding.

Where the operator desires alteration of the direction of travel to the starboard side of the boat, a sequence similar to that just described would occur but with the relative signal voltage magnitudes of direction control foot pedal 12 and steering motor direction sensor 13 reversed, relay coil K1 de-energized, the direction of current flow through steering motor 18 reversed, and the rotation of the steering motor 18 in the clockwise direction.

It is possible to achieve a large range of maneuverability (greater than or equal to ±360°) by insuring that the maximum possible differential voltage input to differential amplifier 30 of angular velocity control 14 and to direction control amplifier 15 is larger than that necessary to effect a ±360° rotation in the direction of the trolling motor thrust. For example, where a ±2 volt differential would result in a ±360° rotation, direction control foot pedal 12 and steering motor direction sensor 13 may be designed to provide up to a ±3 volt differential, resulting in an approximate ±540° range of maneuverability. Although there is of course some differential voltage unit beyond which differential amplifier 30 and direction control amplifier 15 would no longer properly respond, the range of maneuverability can easily exceed 540° and in most cases will likely be limited primarily by the rotational range of steering motor 18 and/or its associated driving apparatus.

As has been noted hereinbefore, the preferred embodiment envisions the pulse width type of modulation of an analog signal. However, it should be readily apparent that the concept of the present invention includes any of the multitude of other suitable types of modulation. For example, direction control foot pedal 12 and steering motor direction sensor 13 may be designed to generate signals whose frequency are proportional to the desired and actual direction of the trolling motor thrust, respectively. These signals may be utilized to frequency modulate the required steering motor angular velocity and direction information. Similarly, other amplitude and phase shift modulation techniques have applicability here. Specifically in regards to binary communications, pulse amplitude modulation, pulse code modulation and pulse position modulation in addition to the described pulse width modulation, are also amenable to the concept of the present invention. Pulse width modulation has merely been detailed as one relatively simple and economical embodiment of the present invention.

Additionally, it must be made clear that the skilled artisan could easily modify the disclosed circuitry so that D.C. steering motors that do not include permanent magnetic fields in place of the normal stator coil would be capable for utilization herein.

Inasmuch as the present invention is subject to many variations, modifications and changes in detail, a number of which have been expressly stated herein, it is intended that all matter described throughout this entire specificaion or shown in the accompanying figures be interpreted as illustrative and not in a limiting sense. It should thus be evident that a device constructed according to the concept of the present invention, and reasonable equivalent thereof, will accomplish the objects of the present invention and otherwise substantially improve the trolling motor steering control art.

We claim:

1. A device for electronic direction control of trolling motors for maneuvering boats comprising:
   means for altering the direction of the trolling motor thrust,
   means for generating a first signal proportional to the desired direction of trolling motor thrust,
   means for generating a second signal proportional to the actual direction of trolling motor thrust.
   means for supplying power to said means for generating a first signal and means for generating a second signal, and
   electronic processing means receiving said first signal and said second signal and providing an output signal for continuously, variably controlling the angular velocity of said means for altering the direction of the trolling motor thrust.

2. A device, as in claim 1, further comprising: second electronic processing means receiving said first signal and said second signal and providing an output signal for controlling the direction of said means for altering the direction of the trolling motor thrust.

3. A device, as in claim 2, said second electronic processing means further comprising: direction relay means for reversing the direction of current flow through said means for altering the direction of the trolling motor thrust.

4. A device, as in claim 2, wherein said electronic processing means includes means receiving said first signal and said second signal for generating a third signal proportional to the magnitude of the difference between said first signal and said second signal, said third signal being generated about some predetermined level.

5. A device, as in claim 4, further including: means receiving said third output signal and electronically obtaining the absolute value of said third output signal about some predetermined level.

6. A device, as in claim 5, wherein said predetermined level is a voltage level intermediate between that of the means for supplying power and a zero voltage reference level.

7. A device, as in claim 1, further comprising: switching means for controlling the flow of current to said means for altering the direction of trolling motor thrust, said switching means receiving the output signal of said electronic processing means and having at least one output transistor whose operational state is primarily controlled by the output signal of said electronic processing means.

8. A device for electronic direction control of trolling motors for maneuvering boats comprising:
   means for altering the direction of the trolling motor thrust,
   means for generating a first signal proportional to the desired direction of trolling motor thrust,
   meanse for generating a second signal proportional to the actual direction of trolling motor thrust,
   meanse for supplying power to said means for generating a first signal and means for generating a second signal, and
   electronic processing means receiving said first signal and said second signal and providing an output signal for variably controlling the angular velocity of said means for altering the direction of the trolling motor thrust, said processing means including
   means receiving said first signal and said second signal for generating a third signal proportional to the magnitude of the difference between said first signal and said second signal, said third signal being generated about some predetermined level,
   means receiving said third output signal and electronically obtaining the absolute value of said third output signal about some predetermined level, and
   level shifting means receiving the output signal from said means electronically obtaining the absolute value and generating a signal proportional to said absolute value signal but whose level has been shifted to the zero voltage reference level.

9. A device, as in claim 8, further including: means receiving the output from said level shifting means and generating a modulated signal proportional to the magnitude of the output of said means to generate a third signal.

10. A device, as in claim 9, wherein said means for generating a modulated signal includes means for adjusting the minimum duration of said modulated signal pulses during any continuous operational period of said means for altering the direction of the trolling motor thrust, said means for adjusting ensuring said means for generating a modulated signal has such an output signal of modulated pulses as to allow for proper operation of said means for altering the direction of the trolling motor thrust.

11. A device, as in claim 9, wherein said modulated signal is of the pulse code type.

12. A device, as in claim 11, wherein said pulse code modulated signal is of the pulse width type having pulses whose durations are proportional to the magnitude of the output of said means to generate a third signal.

* * * * *